United States Patent [19]
Sasaki et al.

[11] Patent Number: 5,863,514
[45] Date of Patent: Jan. 26, 1999

[54] THIN FRAGMENTAL TITANIUM OXIDE AND POROUS BODY AS AN AGGREGATE THEREOF, AND METHODS FOR THEIR PRODUCTION

[75] Inventors: Takayoshi Sasaki; Mamoru Watanabe; Masayuki Tsutsumi, all of Tsukuba, Japan

[73] Assignee: National Institute for Research in Inorganic Materials, Tsukuna, Japan

[21] Appl. No.: 593,810

[22] Filed: Jan. 30, 1996

[30] Foreign Application Priority Data

Aug. 29, 1995 [JP] Japan ................................ 7-243562

[51] Int. Cl.$^6$ .......................... C01G 23/46; C01G 23/47
[52] U.S. Cl. .............. 423/609; 423/69; 423/82; 423/610
[58] Field of Search ..................... 423/609, 610, 423/69, 82; 252/378 R; 23/313 R; 264/28

[56] References Cited

U.S. PATENT DOCUMENTS 3,923,968  12/1975  Basque et al. .......................... 423/610
4,759,916   7/1988  Heikel .................................... 423/610
5,066,404  11/1991  Komatsu et al. .

OTHER PUBLICATIONS

Chemical Abstract, 116:87608, Graetzel, "The artificial leaf, molecular photovoltaics achieve efficient generation of electricity form sunlight" form Coord. Chem. Rev., 111, pp. 167–174, 1991.

Chemical Abstract, 112:10924, Epperson et al, "Sintering of nanophase titania at 550 degrees C", from Mater. Res. Soc. Symp. Proc. vol. 132, pp. 15–20, 1989.

Materials Research Society, 1995 Fall Meeting, Boston, MA, *Colloidal Suspension of Single–Layer Titanate*, Takayoshi Sasaki et al., (1 page).

*Primary Examiner*—Steven Bos
*Attorney, Agent, or Firm*—Oblon, Spivak, McClelland, Maier & Neustadt, P.C.

[57] ABSTRACT

Titanium oxide, comprising lamina shaped titanium oxide particles having a thickness of 10-30 nm and a width of 0.5 to 1 $\mu$m, may be prepared by exfoliating a layered titanic acid powder having a formula $H_xTi_{2-x/4}O_4 \cdot nH_2O$, where x=0.60–0.75, to form a titania sol; followed by drying and heating, to obtain a titanium oxide. The layered titanic acid powder may be prepared by contacting cesium titanate having an orthorhombic layered structure with an aqueous acid solution.

5 Claims, 3 Drawing Sheets

no sources:

THIN FRAGMENTAL TITANIUM OXIDE AND POROUS BODY AS AN AGGREGATE THEREOF, AND METHODS FOR THEIR PRODUCTION

BACKGROUND OF THE INVENTION

1. Field of the Invention

The present invention relates to a thin fragmental titanium oxide and a porous body as an aggregate thereof, and methods for their production. More particularly, this invention relates to a thin fragmental titanium oxide and a porous body as an aggregate thereof, which are useful as pigments, coating materials, cosmetics, additives to e.g. white papers or resins such as nylon, and photofunctional materials such as e.g. catalysts, and method for their production.

2. Discussion of Background

As a method for producing titanium oxide, a method has heretofore been known wherein titanium chloride is oxidized at a high temperature in a gas phase, or a gel obtained by hydrolysis of e.g. titanium sulfate or a titanium alkoxide, is heated to obtain titanium oxide.

However, products produced by such conventional methods are aggregates of fine spherical particles, and porous products are rare. With conventional porous products, the average pore size is at a level of 20 nm at the maximum.

Titanium oxide is widely used for coating materials and cosmetics, and also as additives to resins or papers, by virtue of its excellent characteristics such as whiteness and ultraviolet ray shielding ability. However, such titanium oxide is isotropic spherical fine particles produced by conventional methods and thus has had problems with respect to the coating property, the adhesion and the dispersibility.

SUMMARY OF THE INVENTION

The present invention has been made in view of the above circumstances. It is an object of the present invention to provide non-spherical new titanium oxide which is capable of improving the coating property, the adhesion, the dispersibility, etc., when it is used for coating materials and cosmetics, or as additives to resins or papers and which is applicable also as a photocatalysts or the like, and a process for its production.

To solve the above-mentioned problems, the present invention provides titanium oxide having a thin fragmental shape and a titanium oxide porous body consisting essentially of an aggregate thereof.

Further, the present invention provides a method for producing a thin fragmental titanium oxide, which comprises treating cesium titanate having an orthorhombic layer structure ($Cs_x Ti_{2-x/4} O_4$, x=0.60–0.75) with an aqueous acid solution to form a layered titanic acid powder having a $H_x Ti_{2-x/4} O_4 \cdot nH_2O$ composition, then mixing and stirring this powder with an aqueous amine solution to let the microcrystals be exfoliated and dispersed to a thickness of a nanometer level, drying the resulting titania sol, followed by heating to obtain titanium oxide having a thin fragmental shape, and a method for producing a titanium oxide porous body, which comprises subjecting the above mentioned titania sol to drying treatment to suppress recoagulation of thin fragmental particles, followed by heating to obtain a titanium oxide porous body.

DETAILED DESCRIPTION OF THE PREFERRED EMBODIMENTS

The present invention is as described above. The titanium oxide having a thin fragmental shape and the titanium oxide porous body as an aggregate thereof are novel and have not been known at all in the prior art, and they are expected to bring about new applications of titanium oxide.

More specifically, the titanium oxide having a thin fragmental shape (or a lamina shape) is presented, for example, as the one having a thin fragmental shape with a thickness of a nanometer level, specifically a thickness of about 20 nm, and a high aspect ratio. Further, in the present invention, such a thin fragmental titanium oxide can be converted to a porous body as an aggregate thereof and thus presents a porous body of titanium oxide having a very specific shape i.e. a large specific surface area with meso pores and macro pores developed.

Thin fragmental titanium oxide

The thin fragmental titanium oxide can be prepared, for example, as described above, by contacting cesium titanate having an orthorhombic layer structure ($Cs_x Ti_{2-x/4} O_4$, x=0.60–0.75) with an aqueous acid solution to form a layered titanic acid powder having a $H_x Ti_{2-x/4} O_4 \cdot nH_2O$ composition, then mixing and stirring this powder with an aqueous solution of a basic substance such as an organic amine or an ammonium compound to let the crystals be exfoliated and dispersed to a thickness of a nanometer level, drying the resulting titania sol to obtain a white gelled solid, and heating the gelled solid at a temperature of at least 350° C., since the gelled solid still contains the base and water. In such a case, if the heat treatment temperature is lower than 400° C., the product will be amorphous when the temperature is from 400° to 800° C., the product will have an anatase type crystal structure, and when the temperature is higher than 800° C., the product will have a rutile type crystal structure.

The changes in the composition, the crystal structure and the microstructure in the process for synthesis are analyzed, for example, as follows, by the present inventors.

Firstly, in the titania sol, individual layers of $Ti_{2-x/4} O_4{}^{x-}$ (thickness: at most 1 nm, diameter: at most 1 μm) as basic units of the crystal structure of the layered titanic acid are in a dispersed state in water. When this titania sol is dried, the layers undergo recoagulation (of from 10 to 20 layers) to some extent during the drying process to form a gel. This gel is in the form of an interlaminar compound of the type having water or the amine used as a reagent for separating the layered titanic acid, accommodated between layers. As a result of such recoagulation of laminae, the resulting gel has a complicated microstructure in which thin fragments (laminae) having a thickness at most 30 nm and a width of at most 1 μm are entangled.

Figure 1:
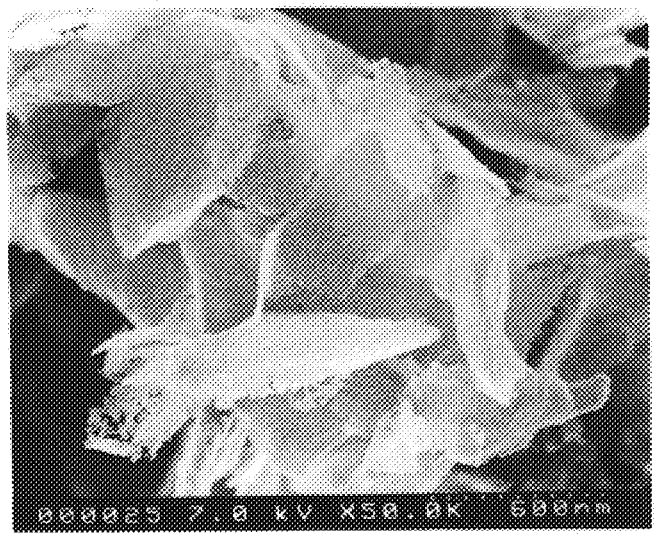
FIG. 1 is a scanning electron micrograph of titanium oxide prepared by the present invention.

When such a gel is then heated, water and the amine, etc. will be removed from interlaminar spaces between the layers at a temperature of from 100° to 350° C., whereby the layered structure will be completely collapsed, and the composition will turn into $TiO_2$. Even after this heat treatment process, the microtexture of the gel prior to the treatment is basically maintained, and accordingly, the product has a very thin fragmental shape of a nanometer level with a thickness about 20 nm. FIG. 1 is a scanning electron microscopic photograph showing such a shape.

Titanium oxide porous body

The titanium oxide porous body of the present invention has a large specific surface area, for example, of a level of from 40 to 110 $m^2.g^{-1}$ and a novel porosity with meso pores and macro pores developed to have a wide range of the pore size, such as from 2 to 100 nm. Such characteristics of the titanium oxide porous body are attributable substantially to the microtexture in which thin fragments are entangled complicately. Namely, it is considered that spaces formed by piling of thin fragments in a disordered fashion serve as pores. Further, irregularities formed on the surface of thin fragments by the heat treatment of the final step of the process are believed to contribute to the development of macro pores, as will be described hereinafter.

Further, with respect to this titanium oxide porous body, the drying procedure gives a substantial influence over the state of aggregation of thin fragmental titanium oxide. For example, a gel obtained by freezing the sol once, followed by vacuum freeze drying, is cotton-like and light as compared with the one simply dried and exhibits a porous appearance. Even when such a gel is actually heated for conversion to titanium oxide, its quality will be maintained. Thus, it has been confirmed that the former is superior to the latter also in the specific surface area and the porosity.

On the other hand, the performance of the porous body can be controlled also by the heat treating step. Namely, the specific surface area and the distribution state of meso pores/macro pores can be changed by the heat-treatment temperature. As the temperature increases, meso pores will diminish, and macro pores will develop. This is believed attributable to the fact that crystallization and grain growth of titanium oxide will progress, whereby irregularities of from a few to a few tens nm will be formed on the surface of thin fragments, and such irregularities will function as relatively large pores.

With respect to the porous body having such characteristics, many applications are expected. One of them is an application as a photocatalyst. Titanium oxide is a semiconductor and accordingly photogenerates positive holes and conductive electrons and thus exhibits a strong oxidation-reduction power. Recently, with a view to providing a clean environment and clean energy, researches have been actively conducted with an aim to utilize it to generate hydrogen and oxygen from water, to decompose a hazardous substance or a bad odor or to utilize it for sterilization. Generally, the catalytic activity is closely related to the specific surface area/porosity. The titanium oxide porous body of the present invention is totally different from conventional titanium oxide which has been heretofore studied, in its surface properties, and is believed to provide a specific catalytic activity accordingly.

Now, the thin fragmental titanium oxide of the present invention and the porous body as an aggregate thereof, and methods for their production will be described in further detail with reference to Examples. However, it should be understood that the present invention is by no means restricted by such specific Examples.

EXAMPLE 1

Cesium carbonate ($Cs_2CO_3$) and titanium dioxide ($TiO_2$) were mixed in a molar ratio of 1:5.3 and calcined at 800° C. for two days to obtain cesium titanate of orthorhombic system ($Cs_2 Ti_{2-x/4} O_4$; x=0.70). This powder was stirred in a 1N hydrochloric acid aqueous solution for three days, followed by filtration and drying in air to obtain a layered titanic acid powder ($H_x Ti_{2-x/4} O_4.nH_2O$).

0.5 g of the titanic acid powder was added to 100 $cm^3$ of an aqueous tetrabutylammonium hydroxide solution (concentration: 0.1 $mol.dm^{-3}$), and the mixture was shaken by a shaker at 150 rpm to form a titania sol. This sol was freezed in a refrigerator (−30° C.), followed by vacuum freeze drying to form a cotton-like gel.

This gel was subjected to heat treatment.

Figure 2A:
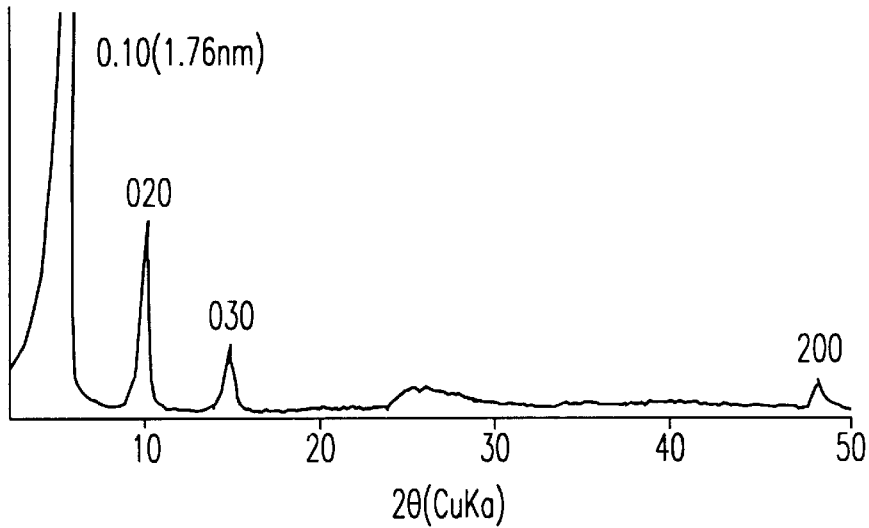
FIG. 2 is a graph showing the changes in the X-ray diffraction chart by heat treatment of a freeze-dried product of titania sol, wherein (a) represents the freeze-dried product, (b) represents the same after heat treatment at 350° C., and (c) represents the same after heat treatment at 700° C.
Figure 2B:
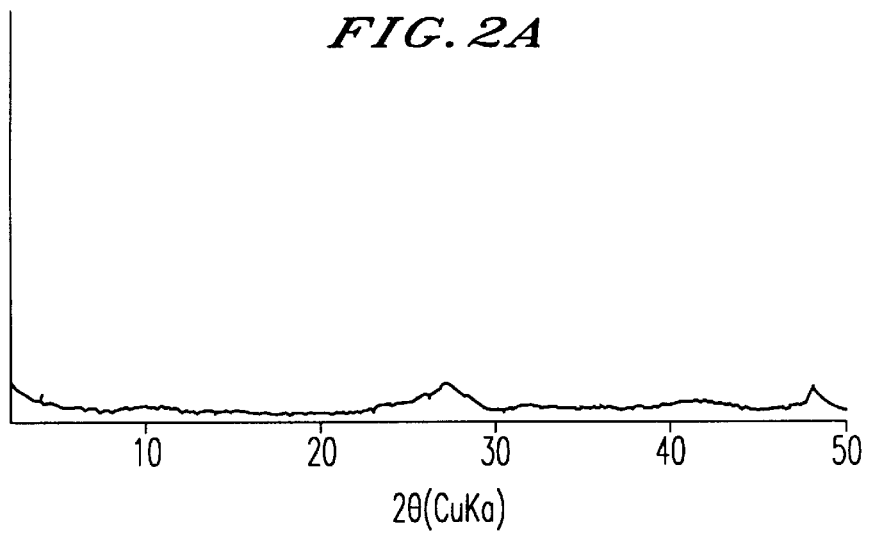
Figure 2C:
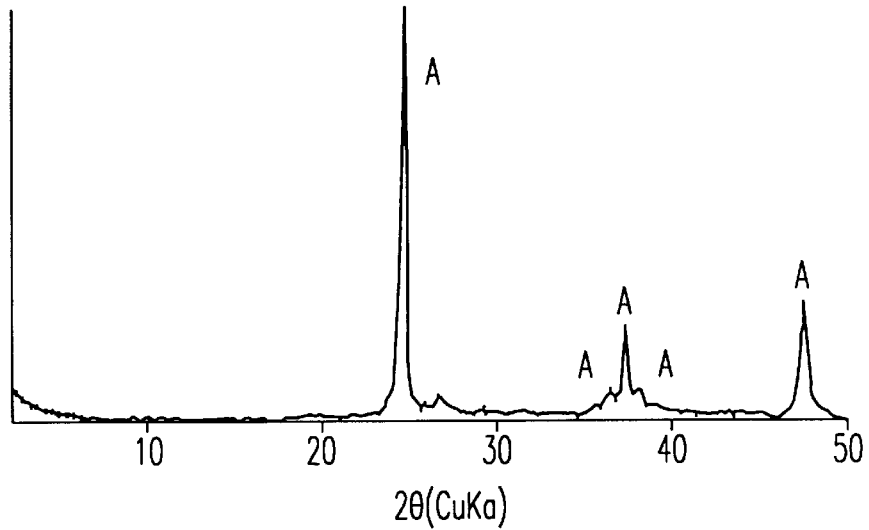

FIG. 2 in the attached drawings shows the changes in the X-ray diffraction chart by the heat treatment of the freeze-dried product of the titania sol. FIG. 2(*a*) represents the freeze-dried product itself, FIG. 2(*b*) represents the one heated at 350° C., and FIG. 2(*c*) represents the one heated at 700° C. The peak at A shows anatase.

From the results of the X-ray diffraction chart in FIG. 2, formation of a phase with an interlaminar distance of 1.76 nm is confirmed with respect to the freeze-dried product in FIG. 2(*a*). This has been identified as an interlaminar compound having tetrabutylammonium ions and water taken into the interlaminar spaces between layers.

The obtained gel was then heated, whereby weight reduction took place due to removal of water and then the amine at a temperature of from 100° to 350° C., and the weight became constant at a higher temperature. The composition turned titanium oxide at the time when the weight loss completed.

From the results of the X-ray diffraction chart in FIG. 2(*b*), it has been found that the layer structure was destroyed by this heat treatment, and the structure became substantially amorphous. Further as is evident also from FIG. 2(*c*), if it is heated at a higher temperature, it crystallizes as anatase.

The above mentioned FIG. 1 is a scanning electron micrograph after the heat treatment, wherein thin fragments having a thickness of from 10 to 30 nm and a width of from 0.5 to 1 $\mu$m are clearly observed. This product shows a cotton-like porous appearance.

EXAMPLE 2

Among titanium oxide products prepared in the same manner as in Example 1, those heat-treated at temperature of 350° C., 500° C. and 700° C., were, respectively, subjected to nitrogen gas adsorption/desorption tests, whereupon the specific surface areas and porosities were evaluated from the obtained adsorption/desorption isotherm.

The purity of the adsorbed nitrogen gas was 99.9999%, the time for adsorption equilibrium was 300 seconds, and the pretreatment was carried out by deaerating at 200 ° C. for two hours.

Figure 3:
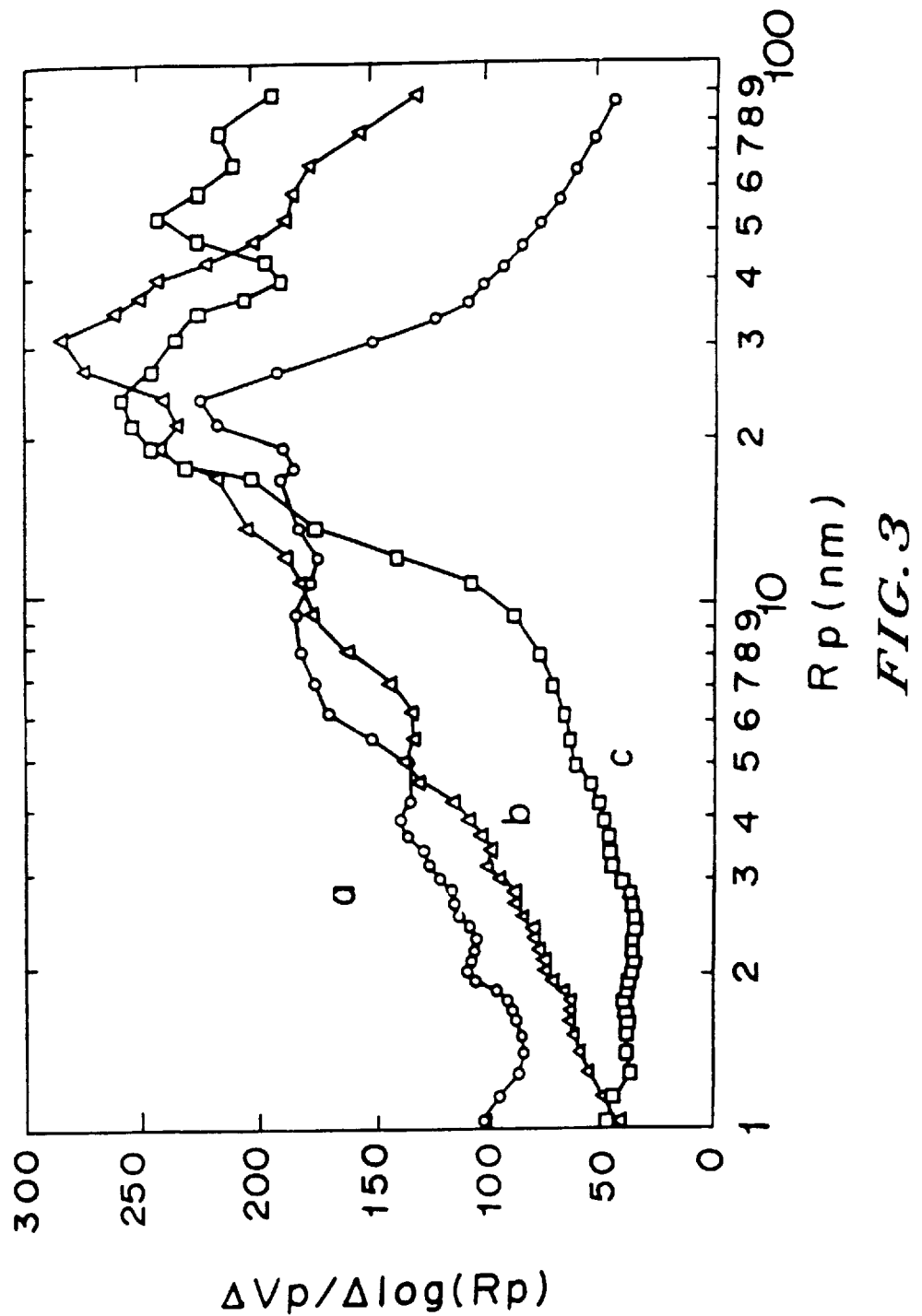
FIG. 3 is a graph showing the pore size distribution of titanium oxide derived from a freeze dried gel, wherein (a) represents a sample heat-treated at 350° C., (b) represents a sample heat treated at 500° C., and (c) represents a sample heat treated at 700° C.

Attached FIG. 3 in the attached drawings shows the pore size distribution of titanium oxide derived from the freeze-dried gel. The abscissa represents the pore radius, and the ordinate represents the pore volume. In FIG. 3, (a) represents the one heated at 350° C., (b) represents the one heated at 500° C., and (c) represents the one heated at 700° C.

As shown in FIG. 3, the product has been found to have a wide pore size distribution ranging from meso ores to macro pores. The specific surface areas of (a), (b) and (c) were calculated to be 103, 76 and 47 $m^2 g^{-1}$, respectively.

As described in detail in the foregoing, the present invention presents titanium oxide having a thin fragmental shape and a porous body having a large specific surface area.

The thin fragmental titanium oxide is expected to improve the coating property, the adhesion and the dispersibility which used to be problematic when conventional titanium oxide has been used for coating materials, cosmetics and as additives to resins or papers. Further, the titanium oxide porous body is expected to be useful as a photocatalyst or the like.

What is claimed is:

1. A titanium oxide porous body consisting essentially of an aggregate of lamina shaped titanium oxide particles having a thickness of 10–30 nm and a width of 0.5 to 1 μm, the titanium oxide porous body having a specific surface area of from 40 to 110 m$^2$/g and a surface characteristic of meso pores and macro pores having a pore size of from 2 to 100 nm.

2. A method for producing the titanium oxide porous body of claim 1, the method comprising:

drying a titania sol comprising lamina shaped titanium oxide particles having a thickness of 10–30 nm and a width of 0.5 to 1 μm; and heating the dried titania sol, thus producing the titanium oxide porous body.

3. The method of claim 2, wherein the drying is vacuum freeze drying.

4. The method of claim 2, wherein the lamina shaped titanium oxide particles are produced by a method comprising:

exfoliating a layered titanic acid powder having a formula $$H_xTi_{2-x/4}O_4 \cdot nH_2O$$

where x=0.60–0.75, to form a titania sol, followed by heating the titania sol, to obtain the lamina shaped titanium oxide particles.

5. The method of claim 2, wherein the lamina shaped titanium oxide particles are produced by a method comprising:

contacting cesium titanate having an orthorhombic layer structure ($Cs_x Ti_{2-x/4} O_4$, x=0.60–0.75) with an aqueous acid solution to form a layered titanic acid powder having a $H_x Ti_{2-x/4} O_4 \cdot nH_2O$ composition, mixing and stirring the powder with an aqueous amine solution to form a titania sol, drying the resulting titania sol, followed by heating the dried titania sol to obtain the lamina shaped titanium oxide having a thin fragmental shape.

* * * * *

UNITED STATES PATENT AND TRADEMARK OFFICE
CERTIFICATE OF CORRECTION

PATENT NO. : 5,863,514
DATED :
INVENTOR(S) : January 26, 1999

Takayoshi SASAKI, et al.

It is certified that error appears in the above-identified patent and that said Letters Patent is hereby corrected as shown below:

On the title page, item [73], Assignee's city is incorrect. It should be:

[73]
--Tsukuba, Japan--

Signed and Sealed this

Twenty-first Day of September, 1999

Attest:

Q. TODD DICKINSON

*Attesting Officer*     *Acting Commissioner of Patents and Trademarks*